US009024938B2

(12) United States Patent
Joshi

(10) Patent No.: US 9,024,938 B2
(45) Date of Patent: May 5, 2015

(54) METHODS AND APPARATUS FOR SWEEP-BASED FREEFORM DEFORMATION OF 3-D MODELS

(75) Inventor: Pushkar P. Joshi, Fremont, CA (US)

(73) Assignee: Adobe Systems Incorporated, San Jose, CA (US)

(*) Notice: Subject to any disclaimer, the term of this patent is extended or adjusted under 35 U.S.C. 154(b) by 571 days.

(21) Appl. No.: 13/194,836

(22) Filed: Jul. 29, 2011

(65) Prior Publication Data

US 2013/0120357 A1 May 16, 2013

(51) Int. Cl.
  G06T 19/00 (2011.01)
  G06T 19/20 (2011.01)

(52) U.S. Cl.
  CPC ......... *G06T 19/20* (2013.01); *G06T 2219/2021* (2013.01)

(58) Field of Classification Search
  CPC ......... G06T 15/00; G06T 19/20; G06T 19/00; G06T 13/40; G06T 17/00; G06T 17/20
  USPC ........................................ 345/419, 423, 420
  See application file for complete search history.

(56) References Cited

U.S. PATENT DOCUMENTS

| | | | |
|---|---|---|---|
| 5,459,820 A * | 10/1995 | Schroeder et al. ............ 345/420 |
| 5,636,338 A | 6/1997 | Moreton |
| 6,313,840 B1 | 11/2001 | Bilodeau et al. |
| 6,650,339 B1 | 11/2003 | Silva et al. |
| 6,781,597 B1 | 8/2004 | Vrobel et al. |
| 7,233,326 B1 | 6/2007 | Silva et al. |
| 8,010,328 B2 * | 8/2011 | Frisken et al. .................. 703/6 |
| 8,400,455 B2 * | 3/2013 | Gregory et al. ............... 345/473 |
| 8,766,978 B2 | 7/2014 | Joshi et al. |
| 2001/0055013 A1 | 12/2001 | Fuki |
| 2002/0095236 A1 | 7/2002 | Dundorf |
| 2006/0017723 A1 | 1/2006 | Baran et al. |
| 2008/0100615 A1 | 5/2008 | Zhao et al. |
| 2008/0121315 A1 | 5/2008 | Gigliotti et al. |
| 2008/0259077 A1 | 10/2008 | Liepa |
| 2009/0110307 A1 | 4/2009 | Markowitz |

(Continued)

FOREIGN PATENT DOCUMENTS

| | | |
|---|---|---|
| EP | 0710381 | 8/1996 |
| EP | 0710381 B | 8/1996 |

OTHER PUBLICATIONS

Yoon et al. "Sweep-based Freeform Deformations". Published 2006.*

(Continued)

*Primary Examiner* — Kimbinh T Nguyen
(74) *Attorney, Agent, or Firm* — Wolfe-SBMC

(57) ABSTRACT

Methods and apparatus for sweep-based freeform deformation of 3-D models may employ a set of intuitive parameters to bend, twist and scale a 3-D model along any direction. The parameters may include a first bend angle, a second bend angle, a twist angle, a scale factor, and a length. Sweep paths may be fitted to an input 3-D model. Each sweep path may be deformed by manipulating one or more parameters for the sweep path. The shape of the 3-D space surrounding each sweep path is deformed according to the sweep path deformations. Deformations in the 3-D space are applied to the 3-D model to deform the model. This allows freeform deformation of the 3-D model by manipulating only a few intuitive parameters. In addition, the sweep path origin and weight functions for each of the parameters may be adjusted by the user.

20 Claims, 15 Drawing Sheets

(56) References Cited

U.S. PATENT DOCUMENTS

| | | |
|---|---|---|
| 2009/0284550 A1 | 11/2009 | Shimada et al. |
| 2010/0054625 A1 | 3/2010 | Wang |
| 2012/0256915 A1* | 10/2012 | Jenkins .................. 345/419 |
| 2013/0076619 A1 | 3/2013 | Carr |
| 2013/0120355 A1 | 5/2013 | Joshi |

OTHER PUBLICATIONS

Snibbe, S., Herndon, K. P., Robbins, D. C., Brookshire Conner, D., and Van Dam, A 1992, Using deformations to explore 3D widget design, In Proceedings of SIGGRAPH '92, Comput. Graph, 26, 2 (July), 351-352.
"Axial deformations: an intuitive deformation technique," Lazarus, F., Coquillart, S., Jancene, P., Computer-Aided Design, vol. 26, Issue 8, Aug. 1994, pp. 607-613.
"Wires: a geometric deformation technique," Singh, K., Fiume, E., Proceedings of the 25th annual conference on Computer graphics and interactive techniques, pp. 405-414 (1998).
"A survey of spatial deformation from a user-centered perspective," Gain, J, Bechmann, D., ACM Transactions on Graphics (TOG), vol. 27 Issue 4, Oct. 2008, pp. 1-36.
"Free-form design using axial curve-pairs," Hui, K.C., Computer-Aided Design, vol. 34, Issue 8, Jul. 2002, pp. 583-595.
"Bender: A virtual ribbon for deforming 3D shapes in biomedical and styling applications," Llamas I., Powell, A., Rossignac, J., and Shaw, C.D., Proceedings of the 2005 ACM symposium on Solid and physical modeling, pp. 89-99.
U.S. Appl. No. 13/608,786, filed Sep. 10, 2012, entitled "Methods and Apparatus for Freeform Deformation of 3-D Models", Nathan A. Carr, et al.
"Non-Final Office Action", U.S. Appl. No. 12/790,570, (Oct. 1, 2013),11 pages.
"Final Office Action", U.S. Appl. No. 12/790,570, (Jun. 6, 2013), 9 pages.
"Non-Final Office Action", U.S. Appl. No. 12/790,570, (Nov. 23, 2012), 9 pages.
Abdel-Malek, Karim et al., "Swept Volumes: Foundations, Perspectives, and Applications", *International Journal of Shape Modeling*, vol. 12, No. 1, (2006), 41 pages.
Carr, Nathan et al., "U.S. Application as Filed", U.S. Appl. No. 13/608,786, filed Sep. 10, 2012, 53 pages.
Gain, James et al., "A Survey of Spatial Deformation from a User-Centered Perspective", *ACM Transactions on Graphics (TOG)*, vol. 27 Issue 4 (Oct. 2008), 36 pages.
Hui, "Free-Form Design Using Axial Curve-Pairs", *Computer-Aided Design*, vol. 34, Issue 8, (Jul. 2002), 13 pages.
Johnstone, John K., et al., "A Rational Model of the Surface Swept by a Curve", *Com put. Graphics Forum 14*(3), (1995), 12 pages.
Joshi, Pushkar P., "U.S. Application as Filed", U.S. Appl. No. 13/194,836, filed Jul. 29, 2011, 52 pages.
Lazarus, Francis et al., "Axial Deformations: An Intuitive Deformation Technique", *Computer-Aided Design*, vol. 26, Issue 8, (Aug. 1994), pp. 607-613.
Llamas, Ignacio et al., "Bender: A Virtual Ribbon for Deforming 3D Shapes in Biomedical and Styling Applications", *Proceedings of the 2005 ACM symposium on Solid and physical modeling*, (2005), 12 pages.
Schroeder, William J., et al., "Implicit Modeling of Swept Surfaces and Volumes", *Proceedings of IEEE Visualization '94, IEEE Press*, (Oct. 1994), pp. 40-45.
Singh, Karan et al., "Wires: A Geometric Deformation Technique", *Proceedings of the 25th annual conference on Computer graphics and interactive techniques*, pp. 405-414 (1998), 10 pages.
Snibbe, Scott S., et al., "Using Deformations to Explore 3D Widget Design", *Proceedings of SIGGRAPH '92, Comput. Graph*, 26, 2 (July), (Jul. 1992), 2 pages.
Wang, Wenping et al., "Robust Computation of the Rotation Minimizing Frame for Sweep Surface Modeling", *Computer-Aided Design 29*, (1997), 13 pages.
Wang, W., Joe, B., 1997. Robust computation of the rotation minimizing frame for sweep surface modelling. Computer-Aided Design 29, 379-391.
W. Schroeder, W. Lorensen, and S. Linthicum. Implicit modeling of swept surfaces and volumes. In Proceedings of IEEE Visualization '94, pp. 40-45. IEEE Press, Oct. 1994.
K. Abdel-Malek, D. Blackmore, and K. Joy. Swept volumes: Foundations, perspectives, and applications. International Journal of Shape Modeling, 2001, 41 pages.
J. Johnstone and J. Williams, A rational model of the surface swept by a curve, Comput. Graphics Forum 14(3), 1995, 77-88.
U.S. Appl. No. 12/790,570, filed May 28, 2010, entitled "Methods and Apparatus for Generating Curved Extrusions,", inventors Pushkar P. Joshi, et al., all pages.
"Corrected Notice of Allowance", U.S. Appl. No. 12/790,570, May 6, 2014, 2 pages.
"Notice of Allowance", U.S. Appl. No. 12/790,570, Jan. 17, 2014, 7 pages.
"Non-Final Office Action", U.S. Appl. No. 13/608,786, Sep. 11, 2014, 10 pages.
Peng, et al.,' "Arc-Length-Based Axial Deformation and Length Preserved Animation", Proceedings of the Computer Animation, Jun. 1997, pp. 86-92.
"Notice of Allowance", U.S. Appl. No. 13/608,786, Dec. 22, 2014, 4 pages.
"Supplemental Notice of Allowance", U.S. Appl. No. 13/608,786, Mar. 4, 2015, 2 pages.

\* cited by examiner

METHODS AND APPARATUS FOR SWEEP-BASED FREEFORM DEFORMATION OF 3-D MODELS

BACKGROUND

Description of the Related Art

Sweep modeling is a type of computer graphics technique that is used to generate solid three-dimensional (3-D) models (which may be referred to as extrusions, or curved extrusions) from two-dimensional (2-D) surfaces. Sweep modeling generally involves moving or "sweeping" a 2-D surface through a 3-D space. The volume swept by the path of the surface defines the 3-D model, or extrusion. In conventional sweep modeling techniques, a space curve is first explicitly defined by the user. Coordinate frames are formed along the space curve, and then cross sections are extruded along the space curve to generate the 3-D model. To make modifications, the user must edit or redefine the space curve. Since these conventional techniques require the user to explicitly define and manipulate the geometry such as the space curve, the user may typically need to have extensive knowledge of 3-D modeling geometry and of the sweep modeling tools to successfully apply these techniques to achieve desired results.

SUMMARY

Various embodiments of methods and apparatus for sweep-based freeform deformation of 3-D models are described that may employ a set of intuitive deformation parameters to bend, twist and scale a given 3-D model along any direction. To accomplish this, embodiments may apply the deformation of the 3-D space surrounding a sweep path fitted to the 3-D model to the input 3-D model. This allows embodiments to perform freeform deformation of the 3-D model by manipulating only a few intuitive parameters. In embodiments, the shape of the space surrounding each sweep path may be controlled by a set of deformation parameters which may include, but are not limited to: an angle of bend in a first orthogonal direction, also referred to as a first bend angle; an angle of bend in a second orthogonal direction, also referred to as a second bend angle; an angle of twist, also referred to as a twist angle; a scale factor that controls scale along the sweep path; and a length of the sweep path. In addition, in at least some embodiments, the sweep path origin and weight (profile) functions for each of the above five deformation parameters may be used to form additional methods for controlling the shape of the sweep path.

In at least some embodiments of a method for sweep-based freeform deformation of 3-D models, an input 3-D model to be deformed may be obtained. The 3-D model may be input in any of a variety of representations. In an initialization phase, the sweep paths, basis vectors, and 3-D point coordinates are initialized. In at least some embodiments, three sweep paths are fitted to the bounding box of the input 3-D model, one each along the X, Y and Z directions respectively. In at least some embodiments, the sweep paths may be represented as polylines with a fixed number of segments. In at least some embodiments, two basis vectors may be fitted to every point of the sweep path polyline. In at least some embodiments, the directions of the basis vectors are such that the two vectors and the sweep path direction are mutually orthogonal. Initially, all basis vectors in the first orthogonal direction are parallel to each other, as are the basis vectors in the second orthogonal direction. In at least some embodiments, at each point of the input 3-D model, 3-D coordinates with respect to the sweep path are computed. In at least some embodiments, the 3-D coordinates for a point are indicated by a 2-D vector that encodes the orthogonal displacement of the point from the sweep path, and a distance of the point along the sweep path.

In an interaction phase, input modifying one or more deformation parameters for one or more of the sweep paths may be obtained via a user interface through which a user may independently manipulate the deformation parameters for each of sweep paths. In at least some embodiments, the user may also specify a value for a weight function corresponding to a deformation parameter. The 3-D model may be deformed according to the deformation parameter(s) for the sweep path (s). After the sweep path is deformed according to the input modifying a deformation parameter, deformed basis vectors may be obtained at every point of the sweep path. Using the sweep path segment and the basis vectors at either endpoint of the segment, the position of each input 3-D model point may be expressed. Given the transformation applied to the sweep path and the basis vectors at the sweep path points, the transformed position of each input 3-D model point may be computed. This provides a relatively fast, simple, and robust method for applying the deformation of sweep path(s) to an input 3-D model.

In at least some embodiments, the order of transformation for the sweep paths may be fixed. For example, in some embodiments, the X sweep path transformation is applied first, followed by the Y sweep path transformation, and finally the Z sweep path transformation is performed. However, the user may iteratively independently manipulate one or more of the deformation parameters for one or more of the sweep paths. These manipulations may be performed in any order. Thus, receiving user input and performing and indicated deformation on a receptive sweep path may be iteratively performed to apply deformations according to one or more of the deformation parameters for one or more of the sweep paths. However, as noted, the order of transformation for the sweep paths may be performed in a fixed order. Thus, processing flow may vary when deformation parameters for particular sweep paths are changed. For example, in some cases, not all sweep path transforms may be performed when a deformation parameter is changed for a sweep path, but in other cases, all of the sweep path transforms may be performed. For example, if the sweep path transform order is X->Y->Z, and if X sweep path deformation parameter(s) are adjusted, the process may go back to the X sweep path transform which is applied to the input 3-D model, followed by the Y sweep path setup and transform applied to the output of the X sweep path transform, followed by the Z sweep path setup and transform which is applied to the output of the Y sweep path transform. However, if Y sweep path deformation parameter(s) are adjusted, the process may go back to the output of a previous X sweep path transform, apply the Y sweep path setup and transform to that output, followed by the Z sweep path setup and transform.

Once the user is done manipulating the deformation parameters and thus done deforming the input 3-D model, a deformed 3-D model may be output. In at least some embodiments, the output 3-D model may be in the same representation or format as the input 3-D model, but with the coordinates of the 3-D points of the model changed according to the applied deformation(s).

Figure 1:
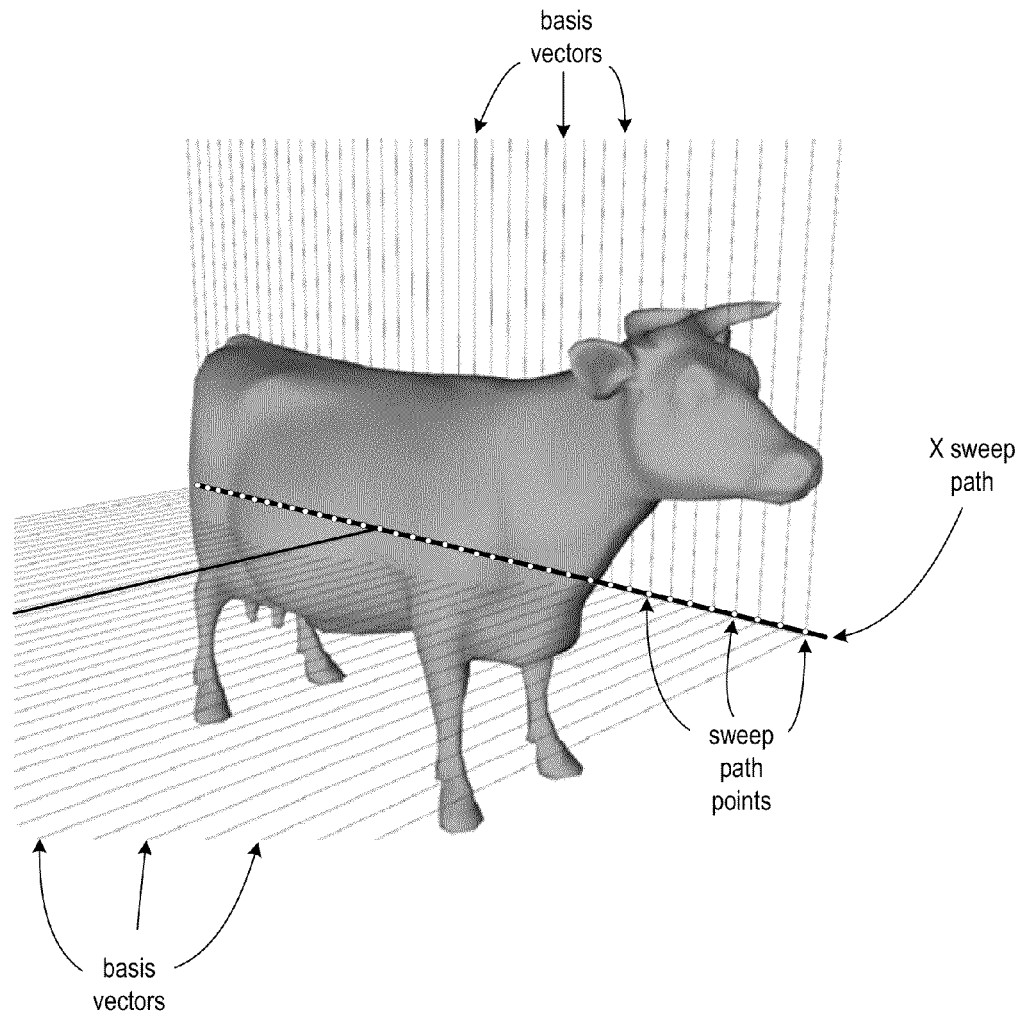
FIG. 1 graphically illustrates the initial state of a sweep path along the X direction for an input 3-D model of a cow, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for sweep-based freeform deformation of three-dimensional (3-D) models are described. A set of extrusion parameters that may be used to obtain curved extrusions from two-dimensional (2-D) objects was described in U.S. patent application Ser. No. 12/790,570, titled "Methods and Apparatus for Generating Curved Extrusions," filed May 28, 2010, whose inventors are Pushkar P. Joshi, Gavin S. P. Miller, and Peter F. Falco, Jr., which is incorporated by reference herein in its entirety. In the system described in U.S. patent application Ser. No. 12/790, 570, the extrusion parameters may include a depth parameter that controls the amount of extrusion, an X angle parameter that controls the angle of bend in the X (horizontal) direction, a Y angle parameter that controls the angle of bend in the Y (vertical) direction, a scale parameter that controls the scale factor, and a twist parameter that controls the angle of extrusion twist. The extrusion parameters allow the method described in U.S. patent application Ser. No. 12/790,570 to deform a sweep path in the extrusion direction. The sweep path deformation is then applied to the extrusion of the given 2-D path. That is, in a Cartesian XYZ coordinate system, if the input 2-D path is in the XY plane, the un-deformed sweep path and extrusion are along the Z direction. Manipulating the sweep path with the intuitive extrusion parameters described in U.S. patent application Ser. No. 12/790,570 allows the method described therein to produce curved extrusions from 2-D objects with relative ease.

Embodiments of methods and apparatus for sweep-based freeform deformation of 3-D models are described that may employ a similar set of intuitive deformation parameters to bend, twist and scale a given 3-D model along any direction, not just the direction of extrusion as in U.S. patent application Ser. No. 12/790,570. To accomplish this, embodiments may apply the deformation of the 3-D space surrounding the sweep path to the input 3-D model. This allows embodiments to perform freeform deformation of the 3-D model—rapid large-scale non-linear transformation of the input 3-D model—by manipulating only a few intuitive parameters.

In embodiments, the shape of the space surrounding each sweep path may be controlled by a set of deformation parameters which may include, but are not limited to: a first bend angle parameter that controls an angle of bend in a first orthogonal direction, a second bend angle that controls an angle of bend in a second orthogonal direction, a twist parameter that controls an angle of twist around the sweep path, a scale factor parameter that controls scale along the sweep path, and a length parameter that controls a length of the sweep path. In addition, in at least some embodiments, the sweep path origin and weight (profile) functions for each of the above five deformation parameters may be used to form additional methods for controlling the shape of the sweep path.

Embodiments of a method for sweep-based freeform deformation of 3-D models may be broadly viewed as including:

an initialization phase, during which the sweep paths are initialized and 3-D coordinates for points on an input 3-D model are computed; and an interaction phase, during which the user may interactively manipulate one or more of the deformation parameters for each of the sweep paths to control the shape of the sweep path(s) and thus deform the 3-D space in which the 3-D model lies. Deforming the 3-D space causes the 3-D model within that space to deform accordingly. When the user adjusts one of the deformation parameters for a sweep path, the resulting deformation of the 3-D model relative to that sweep path may be displayed in real-time or near-real time, thus giving the user immediate feedback as to the results of the adjustment. In some embodiments, other parameters (e.g., weights for the deformation parameters, initial sweep path positions, etc.) may also be user-controllable to effect the deformation of the 3-D model.

Initialization Phase

In at least some embodiments, a method for sweep-based freeform deformation of 3-D models may start by fitting three sweep paths to the bounding box of an input 3-D model, one each along the X, Y and Z directions respectively. In at least some embodiments, by default the sweep paths originate on the lower side (with respect to the X, Y, or Z coordinates respectively) of the bounding box, and pass through the center point of the bounding box. However, the sweep paths may originate at any point, and in at least some embodiments the user may optionally change the sweep path origins.

In at least some embodiments, the sweep paths may be represented as polylines with a fixed number of segments. In at least some embodiments, two basis vectors may be fitted to every point of the sweep path polyline (see, e.g., FIG. 1). In at least some embodiments, the directions of the basis vectors are such that the two vectors and the sweep path direction are mutually orthogonal. Initially, all basis vectors in the first orthogonal direction are parallel to each other, as are the basis vectors in the second orthogonal direction.

In at least some embodiments, at each point of the input 3-D model, 3-D coordinates with respect to the sweep path are computed. In at least some embodiments, the 3-D coordinates for a point are indicated by a 2-D vector that encodes the orthogonal displacement of the point from the sweep path, and a distance of the point along the sweep path. For each sweep path, embodiments may identify the sweep path points that are at immediately less than and greater than the distance of each point along the sweep path. The segment defined by these sweep path points is said to "own" the space that contains that point in the 3-D model. That point can be expressed in the coordinate system defined by the basis vectors stored at one of the segment endpoints and the segment itself. The basis vectors at either endpoint of the segment may be chosen to express the point. In at least some embodiments, the point is expressed using both bases and taking the average of the coordinate values returned. With three sweep paths, three 3-D coordinates are computed and stored for every point of the input model. While embodiments are described that employ three sweep paths, other embodiments may employ fewer or more sweep paths. Thus, more generally, for n sweep paths, n 3-D coordinates are computed and stored for every point of the input 3-D model.

FIG. 1 graphically illustrates the initial state of a sweep path along the X direction for an input 3-D model of a cow, according to at least some embodiments. The sweep path points are shown as small white circles on the sweep path, and the basis vectors at each point are shown.

Interaction Phase

Figure 5A:
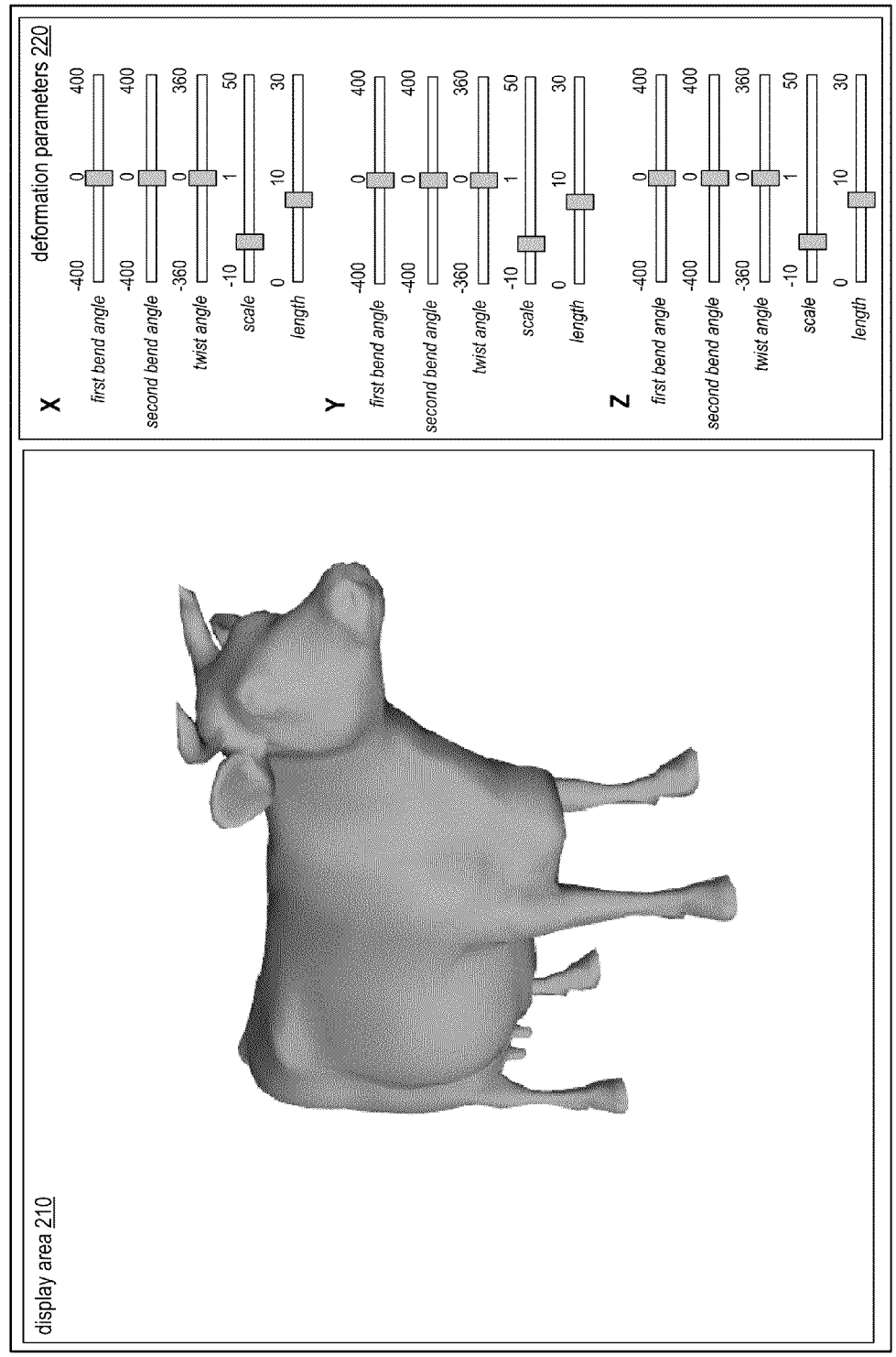
FIGS. 5A through 5C illustrate an example user interface to the sweep-based freeform deformation method for 3-D models via which a user may manipulate the deformation parameters for each of three sweep paths, according to at least some embodiments.
Figure 5B:
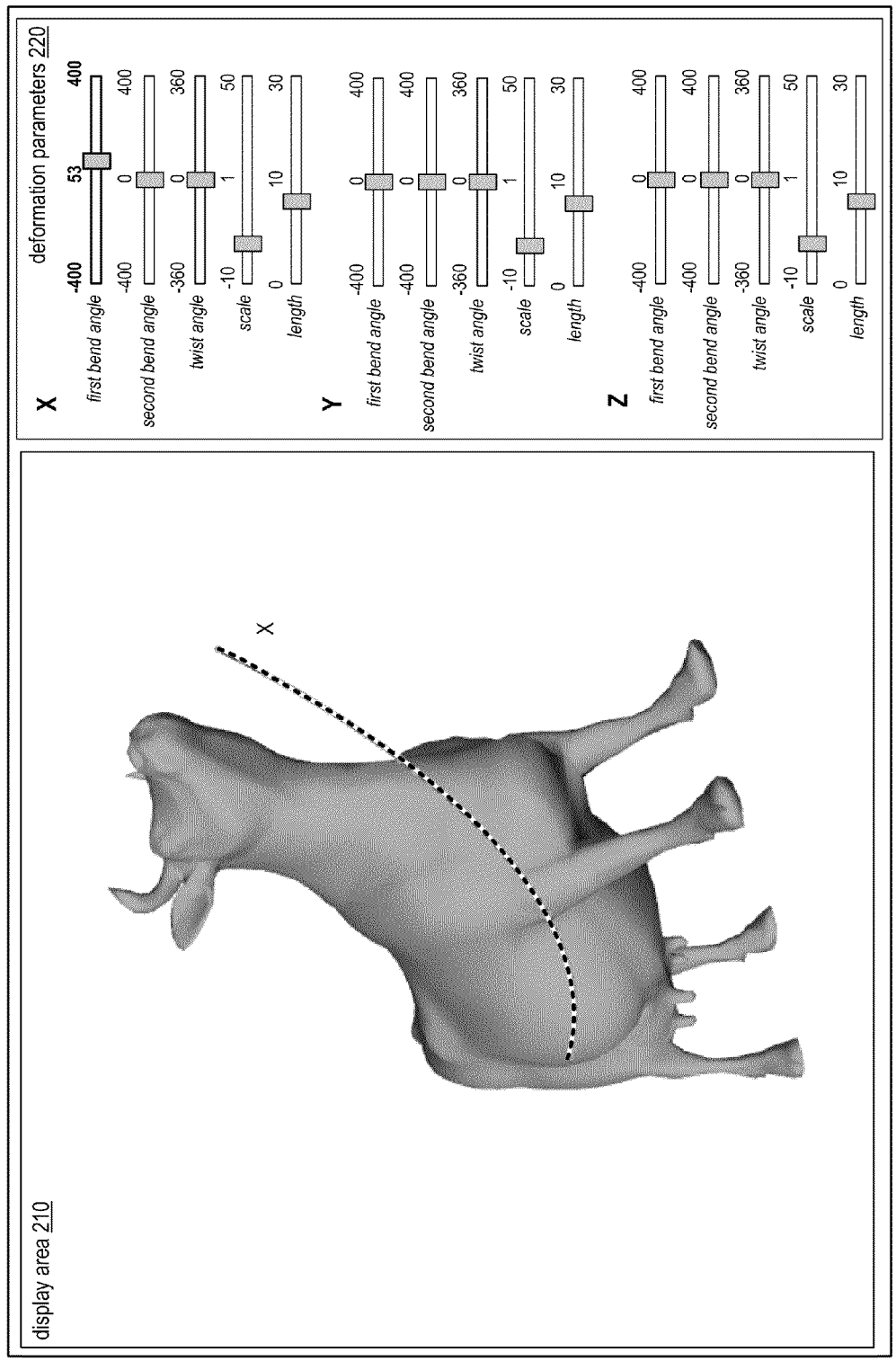
Figure 5C:
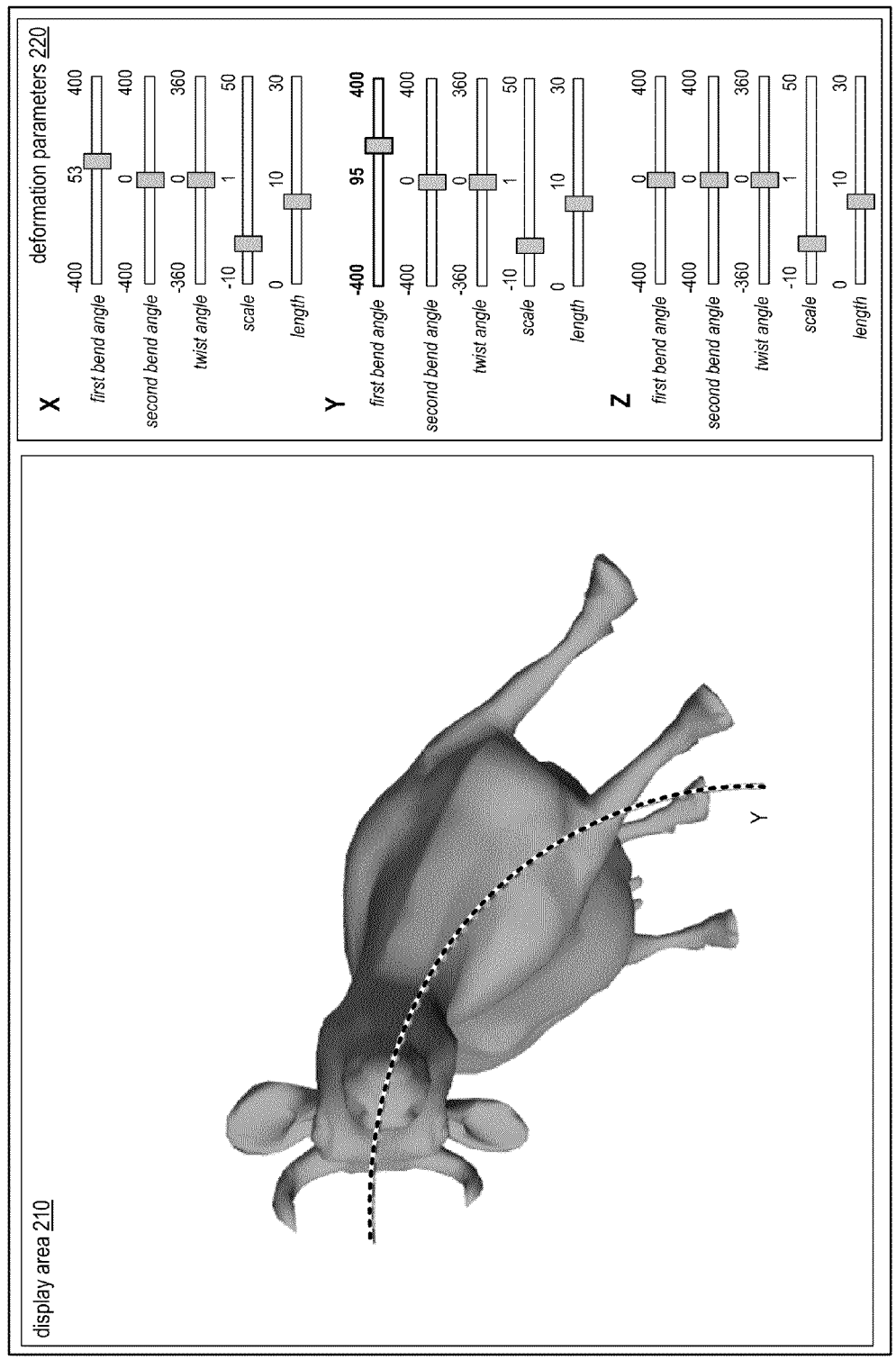

During the interaction phase, by manipulating one or more of the deformation parameters for one or more of the sweep paths, a user may deform the sweep paths into curved polylines. FIGS. 5A through 5C illustrate an example user interface via which a user may independently manipulate each of five deformation parameters (first bend angle, second bend angle, twist angle, scale factor, and length) for each of three sweep paths that may be used in some embodiments. After a sweep path is deformed, deformed basis vectors may be obtained at every point of the sweep path. In at least some embodiments, a rotation-minimizing frame technique may be used to obtain the deformed basis vectors. However, other techniques may be used.

As previously noted, during initialization, each point of the input 3-D model is assigned a sweep path segment. Using the sweep path segment and the basis vectors at either endpoint of the segment, the position of each input 3-D model point may be expressed. Given the transformation applied to a sweep path and the basis vectors at the sweep path points, embodiments may compute the transformed position of each input 3-D model point. This provides a relatively fast, simple, and robust method for applying the deformation of a sweep path to the input 3-D model.

Figure 2A:
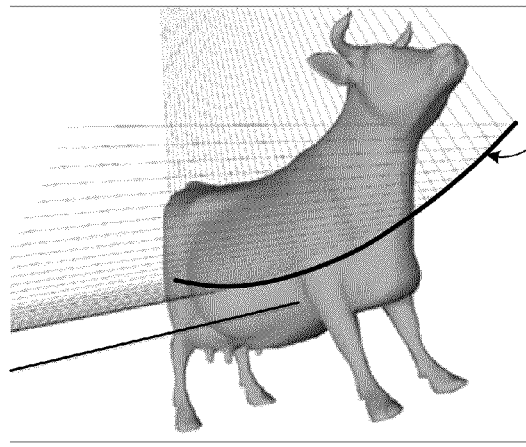
FIGS. 2A through 2E graphically illustrate examples of transformations applied to the example input 3-D model illustrated in FIG. 1 by independently manipulating the five deformation parameters for the X sweep path of the input 3-D model, according to at least some embodiments.
Figure 2B:
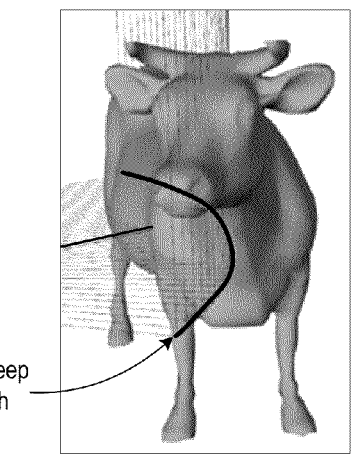
Figure 2C:
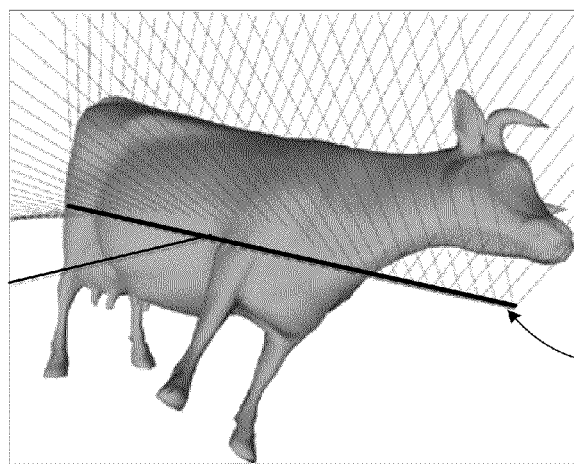
Figure 2D:
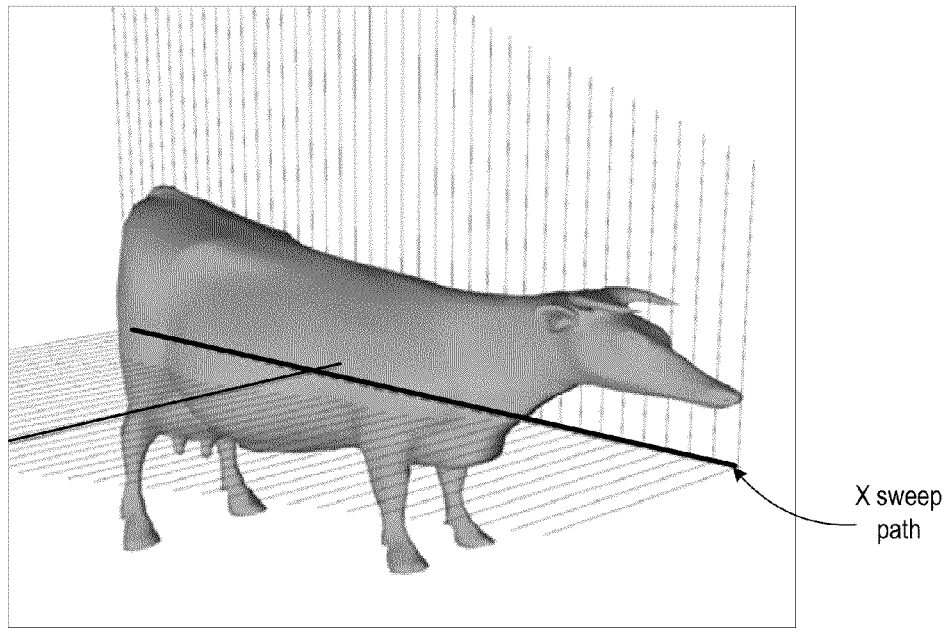
Figure 2E:
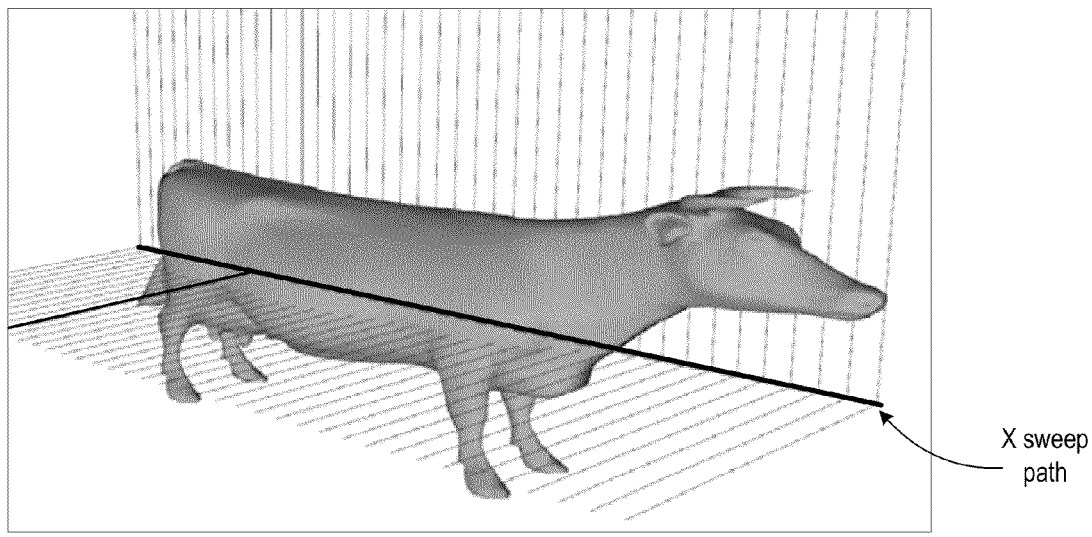

FIGS. 2A through 2E graphically illustrate examples of transformations applied to the example input 3-D model illustrated in FIG. 1 by independently manipulating the five deformation parameters for the X sweep path of the input 3-D model, according to at least some embodiments. FIG. 2A illustrates the transformation applied to the 3-D model when independently increasing the first bend angle for the X sweep path. FIG. 2B illustrates the transformation applied when independently increasing the second bend angle for the X sweep path. FIG. 2C illustrates the transformation applied when independently increasing the twist angle for the X sweep path. FIG. 2D illustrates the transformation applied when reducing the scale for the X sweep path. FIG. 2E illustrates the transformation applied when increasing the length of the X sweep path.

Deformation Along Multiple Sweep Paths

At least some embodiments may allow users to deform the sweep paths along the X, Y and Z directions substantially simultaneously, and in any order. For example, some embodiments may allow the users to modify one or more deformation parameters (and thus deform the input 3-D model) for the sweep path along the X direction, then for the sweep path along the Y direction, then again for the sweep path along the X direction, and so on.

In at least some embodiments, the order of transformation for the sweep paths may be fixed. In some embodiments, the X sweep path transformation is applied first, followed by the Y sweep path transformation, and finally the Z sweep path transformation is performed. However, note that this order is arbitrary, and other orders for transforming the sweep paths may be used in some embodiments. In some embodiments, the order of transformation of the sweep paths may be a user-specifiable option.

Figure 3:
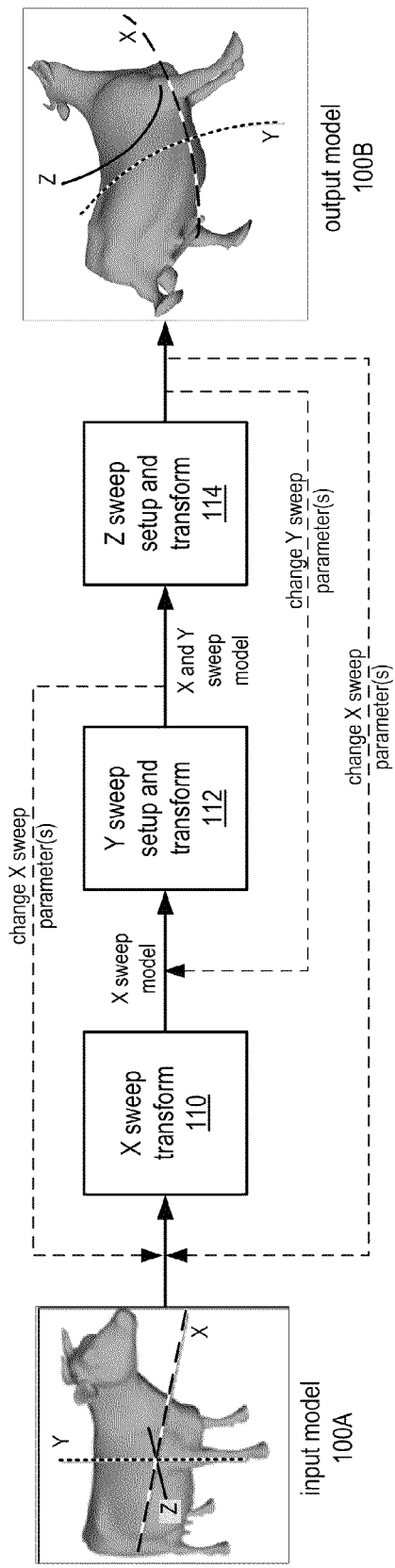
FIG. 3 is a block diagram that illustrates processing flow using an example fixed order of transformation, according to at least some embodiments.

FIG. 3 is a block diagram that illustrates processing flow using an example fixed order of transformation in which the X sweep path transform 110 is applied to an input 3-D model 100A first, followed by the Y sweep path transform 112, and finally the Z sweep path transform 114, according to some embodiments. After applying the X sweep path transform 110 to input 3-D model 10 due to the X sweep path deformation, if any, the coordinates of the transformed 3-D model with respect to the Y sweep path are re-computed. Then the Y sweep path transform 112 due to the Y sweep path deformation, if any, is applied, and the coordinates of the further transformed model with respect to the Z sweep path are re-computed. Finally, the Z sweep path transform 114 due to the Z sweep path deformation, if any, is applied, resulting in deformed output 3-D model 100B.

The dashed lines indicate where processing flow goes if deformation parameters for a given sweep path are changed. For example, if X sweep path deformation parameter(s) are adjusted, the process goes back to the X sweep path transform 110, which is applied to the input 3-D model 100A, followed by the Y sweep path setup and transform 112, followed by the Z sweep path setup and transform 114. However, if Y sweep path deformation parameter(s) are adjusted, the process may go back to the output of the X sweep path transform 110 (X sweep model), apply the Y sweep path setup and transform 112, followed by the Z sweep path setup and transform 114.

An advantage of the substantially simultaneous deformation technique described above is that the transformation applied to one sweep path (e.g., the X sweep path) is carried over when deforming the next sweep path (e.g., the Y or Z sweep path) and is still editable without undoing any of the transformations applied after it. However, a possible disadvantage of the substantially simultaneous deformation technique is that the order of the transformations may be significant, and users may get confused if they do not understand the transformation order.

Figure 4A:
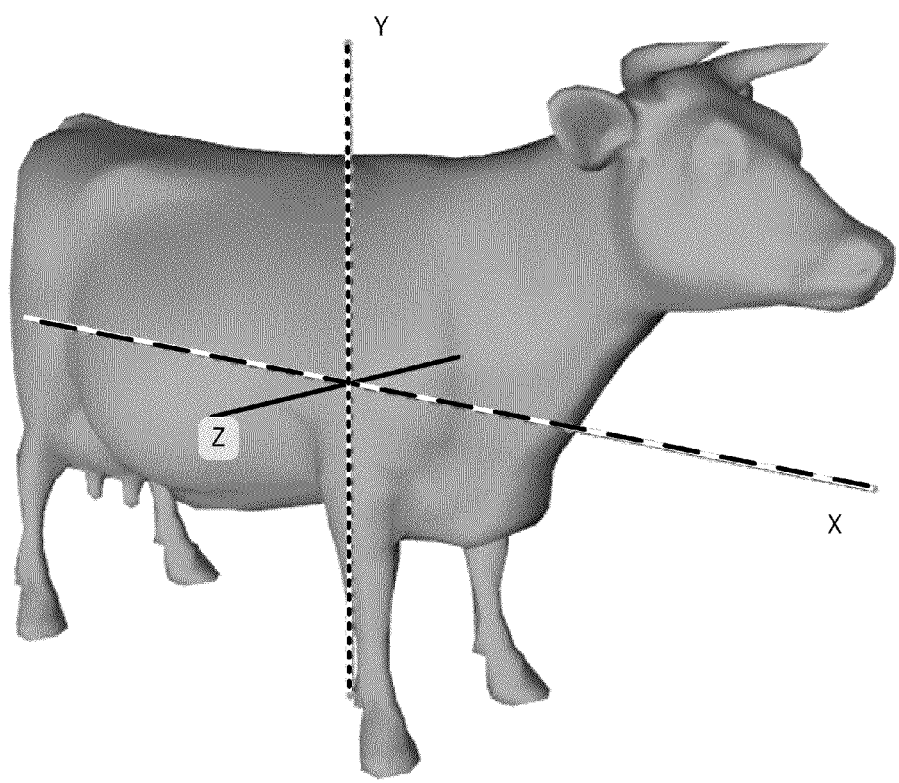
FIGS. 4A through 4E graphically illustrate a substantially simultaneous deformation technique along multiple sweep paths, according to at least some embodiments.
Figure 4B:
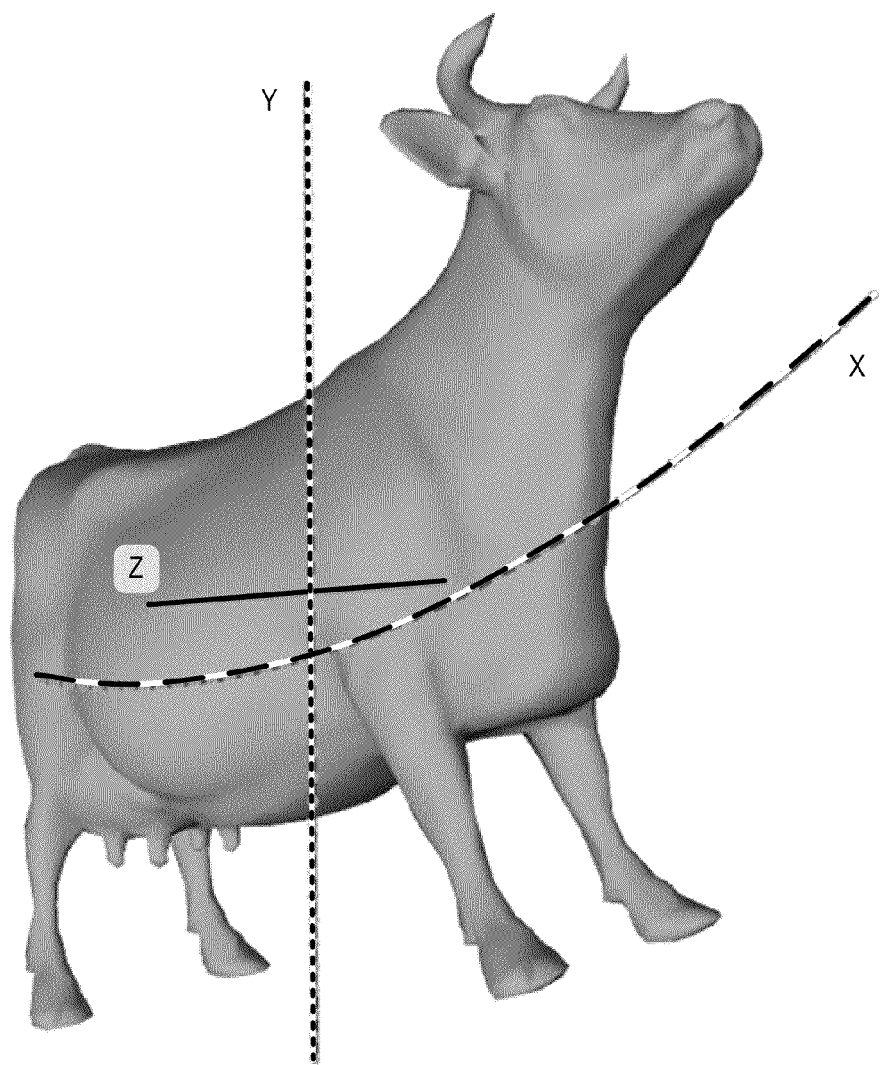
Figure 4C:
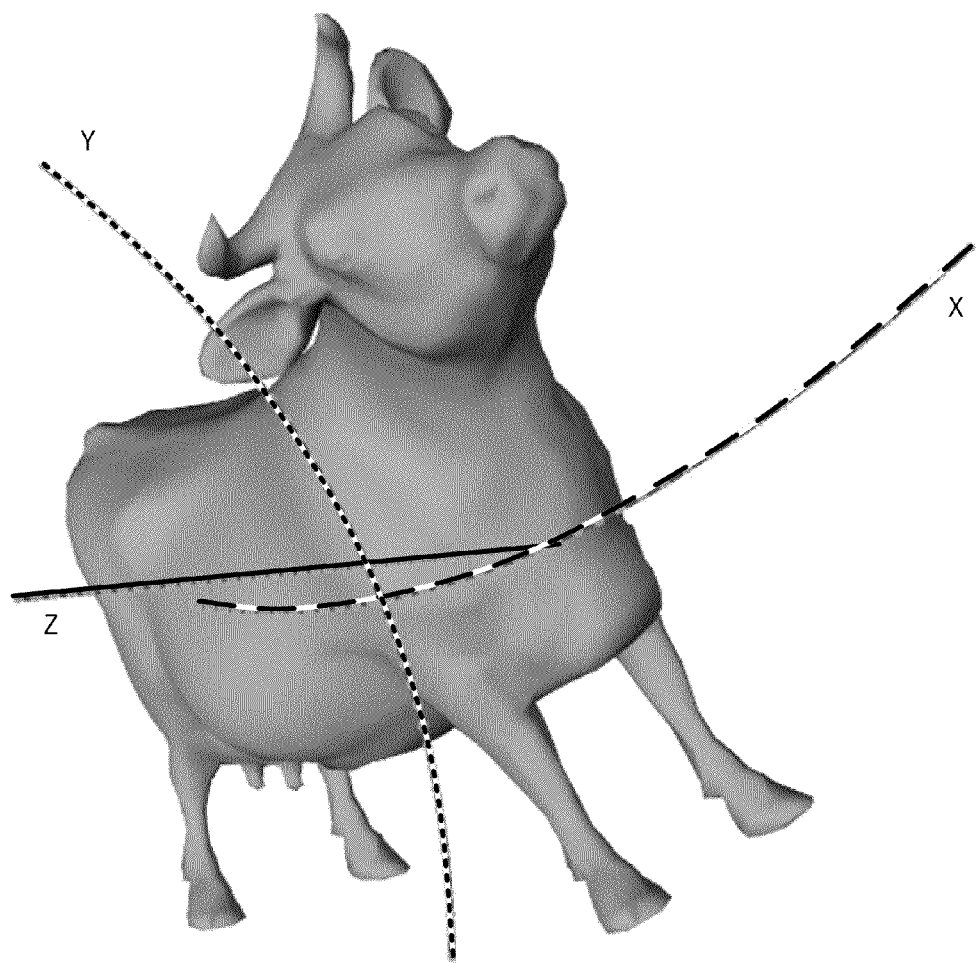
Figure 4D:
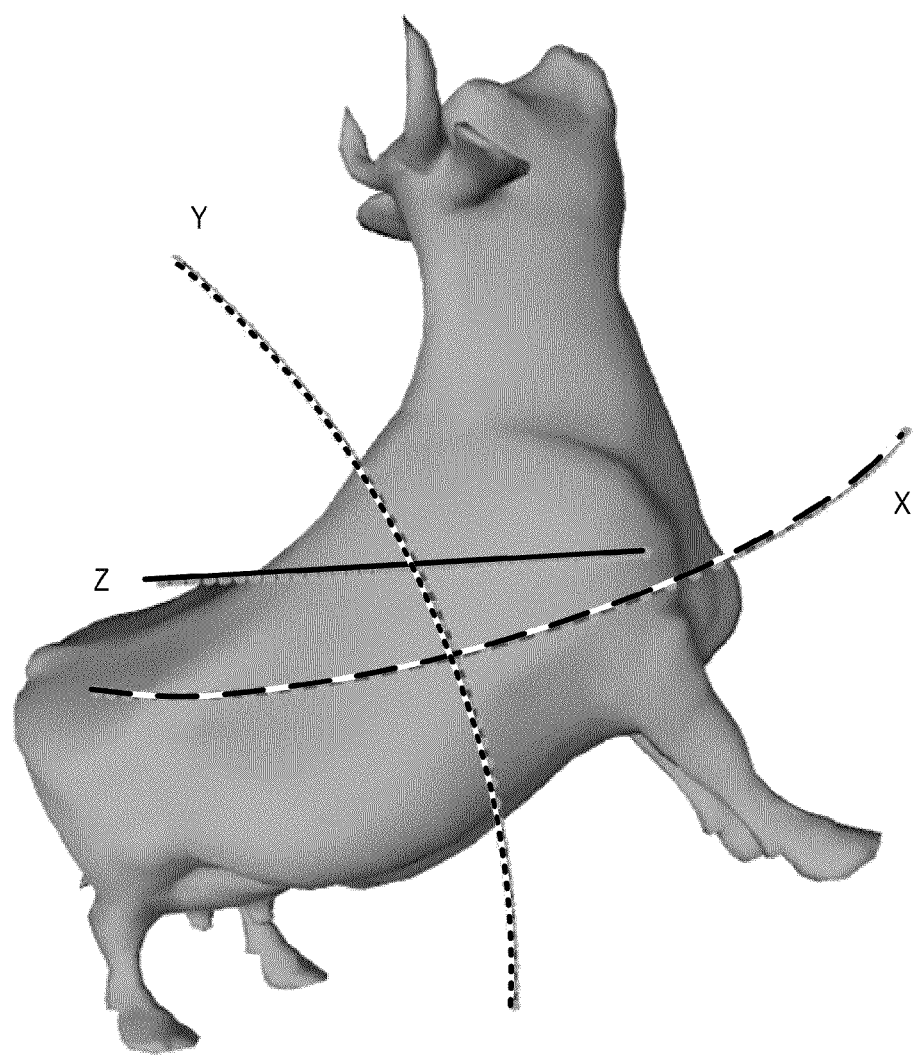
Figure 4E:
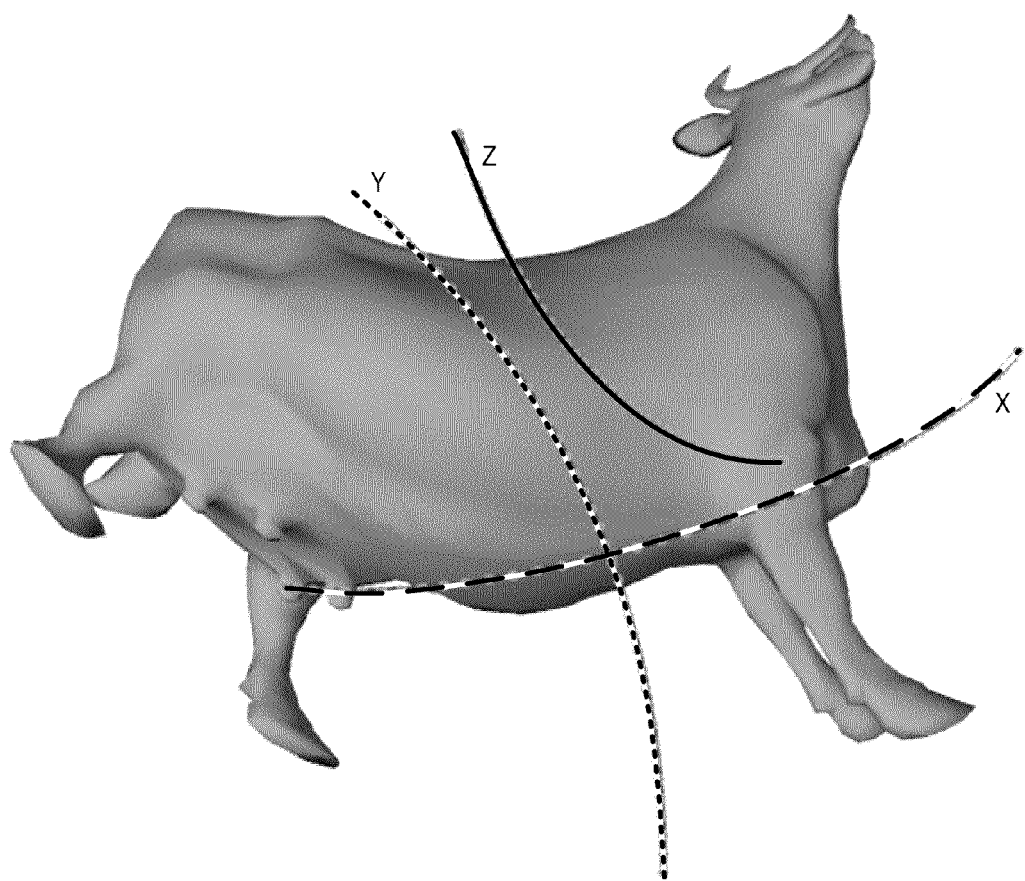

FIGS. 4A through 4E graphically illustrate a substantially simultaneous deformation technique along multiple sweep paths, according to at least some embodiments. FIG. 4A illustrates an example initial state of three sweep paths along the X, Y, and Z directions for an example initial (input) 3-D model, according to at least some embodiments. FIGS. 4B through 4E illustrate deforming the 3-D model by deforming the sweep paths in the X, Y, and Z directions substantially simultaneously. Given the initial state illustrated in FIG. 4A, the first bend angle for the X sweep path is increased, as illustrated in FIG. 4B. Note that the Y and Z sweep paths are shifted due to the change in the bounding box after the X sweep path deformation. In FIG. 4C, the first bend angle for the Y sweep path is increased. In FIG. 4D, the second bend angle for the X sweep path is increased. In FIG. 4E, the first bend angle for the Z sweep path is increased.

Sweep Paths

While embodiments are described that employ three sweep paths, specifically X, Y and Z sweep paths, other embodiments may employ fewer or more sweep paths. For example, an embodiment may employ only one of the X, Y and Z sweep paths, or two of the X, Y and Z sweep paths. As another example, an embodiment may employ the X, Y and Z sweep path and at least one additional sweep path. In some embodiments, the number of sweep paths to be employed to deform a 3-D model may be a user-selectable option.

As previously described in the Initialization phase section, in at least some embodiments, by default the sweep paths originate on the lower side (with respect to the X, Y, or Z coordinates respectively) of the bounding box, and pass through the center point of the bounding box. However, the sweep paths may originate at any point, and in at least some embodiments the user may optionally change the sweep path origins. In addition, in at least some embodiments, the user may optionally specify that the sweep paths are to pass through other points than the center. Thus, the user may control the location of the sweep paths in the bounding box, and thus relative to the 3-D model.

Changing Deformation Parameters Along the Sweep Paths

In at least some embodiments, the deformation parameters that take numerical values (first bend angle, second bend angle, twist angle, scale factor, and length) are applied uniformly throughout the respective sweep path. In these embodiments, the sweep path cannot change the initial turn that it started with, or have a change of direction. However, the user may desire to change one or more of the deformation parameters along a sweep path to achieve a desired effect. Some embodiments may thus provide a mechanism for changing one or more of the deformation parameters along the sweep path.

In some embodiments, this may be achieved by providing user-controllable weight functions for one or more of the deformation parameters for each sweep path. When applying deformation parameters to a sweep path, the deformation parameters may be multiplied by the respective user-controllable weight functions that are defined along the sweep path. In at least some embodiments, the domain of the function (i.e. values for which it is defined) is the parametric interval along the length of the sweep path. In at least some embodiments, the parametric distance is 0 at the beginning of the sweep path and 1 at the end of the sweep path. In at least some embodiments, initially and by default, the weight is 1 for all points on the sweep path between (and including) parametric distance 0 and parametric distance 1. However, the user can change the weight function to multiply the parameter values at different points along the path with a different factor. For example, for the first bend angle, if the user sets the weight function to be zero at all points but 1 at or close to parametric distance 0.5, there will be a bend in the first orthogonal direction only in the middle of the extrusion. As another example, for the scale factor, the user may define an undulating, wavy weight function that causes the 3-D model to be alternatively expanded and shrunk along the respective sweep path. In some embodiments, the weight function for a deformation parameter can be positive or negative, and may be set to a wide range of values.

Different Parameter Sets

Embodiments have been described that provide five user-controlled deformation parameters (first bend angle, second bend angle, twist angle, scale factor, and length), that may also provide user-controllable weight functions for one or more of the deformation parameters, and that may also allow the user to control the initial positioning of the sweep paths. However, some embodiments may provide only a subset of the five described deformation parameters. For example, an embodiment may provide only one of the bend angle parameters. In addition, some embodiments may provide additional deformation parameters. For example, an embodiment may provide more than two bend angle parameters.

3-D Model Representations

To deform the 3-D model, the sweep-based freeform deformation method may iterate over every 3-D point of the 3-D model and compute new coordinates for each 3-D point with respect to the deformed sweep path(s). Thus, the input 3-D model may be represented in any form or data structure that provides a set of 3-D points. Therefore, embodiments may support a wide variety of 3-D model representations as input. For example, the 3-D model may be represented as a point cloud, a mesh, a NURBS patch, a subdivision surface, or in general in any form that provides the set of 3-D points that represent the 3-D object. Note that the deformed 3-D model may be output in the same representation as input, or alternatively may be output in a different representation.

Example User Interface

FIGS. 5A through 5C illustrate an example user interface via which a user may manipulate the deformation parameters for each of three sweep paths that may be used in some embodiments, and is not intended to be limiting. FIG. 5A illustrates an example user interface that includes at least a display area 210 in which an initial 3-D model is displayed and a deformation parameters 220 area that includes user interface elements via which the deformation parameters (first bend angle, second bend angle, twist angle, scale, and length) for each sweep path (in this example, the X, Y, and Z sweep paths) may be independently adjusted. In this example, the user interface elements to control the deformation parameters are shown as slider bars. However, note that other types of user interface elements (e.g., dials, buttons, popup menus, alphanumeric entry boxes, etc.) may be used for controlling one or more of the deformation parameters.

FIG. 5A shows three banks or sets of slider bars, five each for the X, Y, and Z sweep paths. The five slider bars in each set control the first bend angle, the second bend angle, the twist angle, the scale along the respective sweep path and the total length of the respective sweep path. The numbers above each slider bar indicate an example range and default or initial setting, and are not intended to be limiting.

In FIG. 5B, the value for the first bend angle of the X sweep path has been increased from the default setting of 0 to 53, with the resulting transformation of the X sweep path and deformation of the 3-D model shown on display area 210.

In FIG. 5C, the value for the first bend angle of the Y sweep path has been increased from the default setting of 0 to 95, with the resulting transformation of the Y sweep path and deformation of the 3-D model shown on display area 210. Note that the value for the first bend angle of the X sweep path is still set to 53, while the values of all of the other parameters for all sweep paths are still at their default setting.

Note that the user may adjust the deformation parameters in any order; however, in at least some embodiments the transforms are performed in a fixed order as illustrated in FIG. 3 and described in the section titled Deformation along multiple sweep paths. For example, if the user were to subsequently change an X sweep path deformation parameter after changing the Y sweep path parameter as illustrated in FIG. 5C, the method may return to the original input 3-D model, apply the X sweep path transform, and then re-apply the Y sweep path transform, as illustrated in FIG. 3. However, if the user was to subsequently change a Z sweep path deformation parameter, the method may simply apply the transform to the deformed 3-D model output by the Y sweep path transform.

As an alternative to the method described above in which each adjustment of a deformation parameter results in a deformation of the 3-D model, which is then displayed, some embodiments may allow a user to change two or more deformation parameters without immediately deforming the 3-D model, and then apply all of the changes at once. For example, the user interface may provide an "apply changes" or similar user interface element via which a user may apply all current settings of the deformation parameters. In some embodiments, these two methods of applying changes to the deformation parameters (an immediate mode, in which changing a deformation parameter is immediately applied, and a delayed mode, in which changes to the deformation parameters are not applied until the user indicates they are to be applied) may be provided as user-selectable options.

Note that the example user interface illustrated in FIGS. 5A through 5C may include other user interface elements or tools for controlling or modifying other aspects of the 3-D model and/or other aspects of the sweep-based freeform deformation method. For example, the user interface may provide "flip orientation," "rotate," or similar user interface elements via which the user may horizontally or vertically invert the 3-D model, rotate the 3-D object, or otherwise affect the 3-D model separately from the sweep path deformation parameters. As another example, the user interface may provide "undo" and "reset" user interface elements via which the user may undo the previous operation or reset the deformation back to the initial state, respectively. As another example, the user interface may provide one or more user interface elements via which the user may control a weight function for one or more of the deformation parameters on each sweep path. As another example, the user interface may provide one or more user interface elements or tools via which the user may control the initial positioning of the sweep paths, e.g. by specifying a different origin for one or more of the sweep paths. As another example, the user interface may provide one or more user interface elements via which the user may specify the number of sweep paths to be employed.

Flowchart of a Method for Sweep-Based Freeform Deformation of 3-D Models

Figure 6:
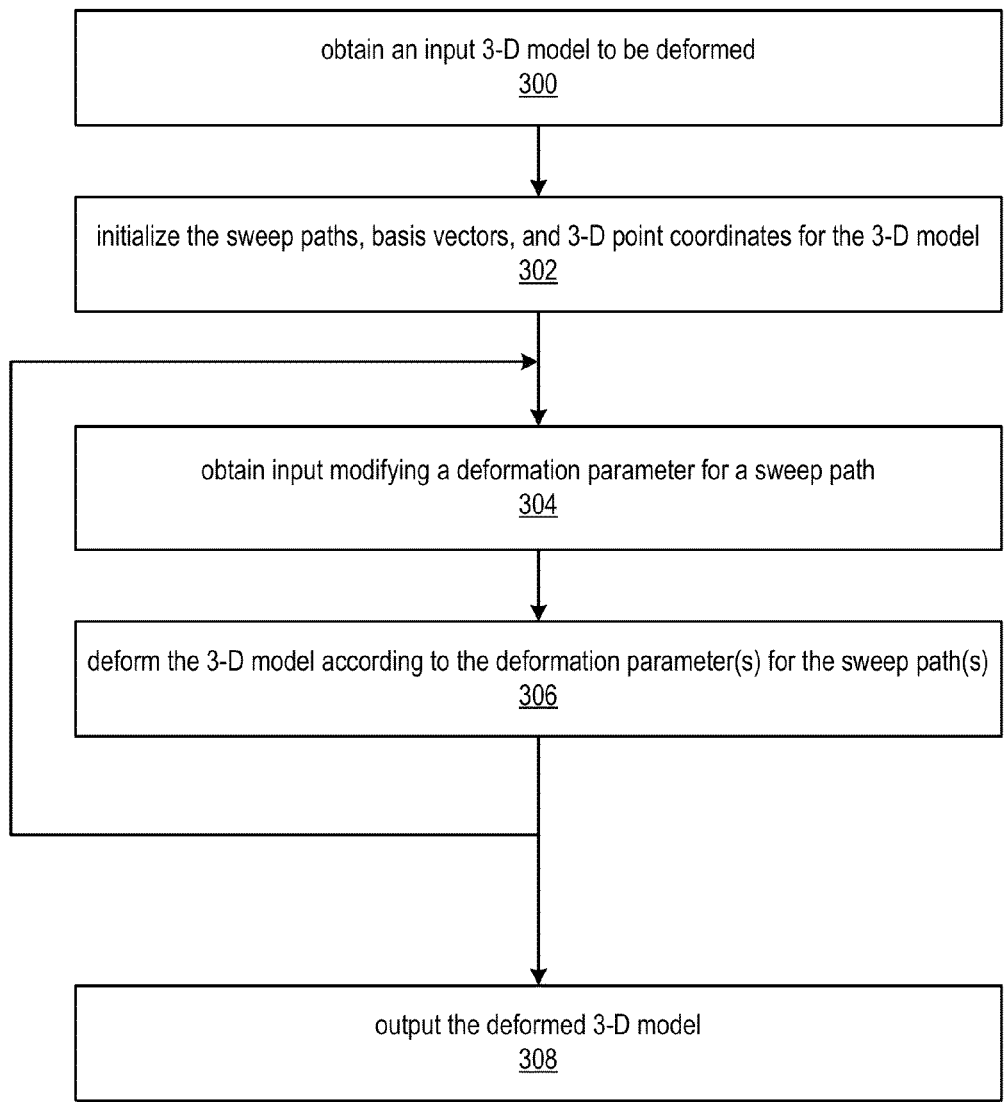
FIG. 6 is a flowchart of a method for sweep-based freeform deformation of 3-D models according to at least some embodiments.

FIG. 6 is a flowchart of a method for sweep-based freeform deformation of 3-D models according to at least some embodiments. As indicated at 300, an input 3-D model to be deformed may be obtained. For examples of an initial 3-D model, see FIGS. 1, 4A, and 5A. The 3-D model may be input in any of a variety of representations.

As indicated at 302, the sweep paths, basis vectors, and 3-D point coordinates are initialized. The freeform deformation is performed as a translational sweep along one or more sweep paths. In at least some embodiments, three sweep paths are fitted to the bounding box of the input 3-D model, one each along the X, Y and Z directions respectively. In at least some embodiments, the sweep paths may be represented as polylines with a fixed number of segments. In at least some embodiments, two basis vectors may be fitted to every point of the sweep path polyline (see, e.g., FIG. 1). In at least some embodiments, the directions of the basis vectors are such that the two vectors and the sweep path direction are mutually orthogonal. Initially, all basis vectors in the first orthogonal direction are parallel to each other, as are the basis vectors in the second orthogonal direction. In at least some embodiments, at each point of the input 3-D model, 3-D coordinates with respect to the sweep path are computed. In at least some embodiments, the 3-D coordinates for a point are indicated by a 2-D vector that encodes the orthogonal displacement of the point from the sweep path, and a distance of the point along the sweep path. For further discussion of initialization as performed at 302, see the section titled Initialization phase.

As indicated at 304, input modifying a deformation parameter for a sweep path may be obtained. In at least some embodiments, five deformation parameters (first bend angle, second bend angle, twist angle, scale factor, and length) may be provided for each sweep path. FIGS. 5A through 5C illustrate an example user interface via which a user may independently manipulate the five deformation parameters for each of three sweep paths that may be used in some embodiments. In at least some embodiments, the user may also specify a value for a weight function corresponding to the deformation parameter, as previously described.

As indicated at 306, the 3-D model may be deformed according to the deformation parameter(s) for the sweep path(s). By manipulating a deformation parameter for a sweep path, the user may deform the respective sweep path into a curved polyline, or may apply further deformation to a previously deformed sweep path. After the sweep path is deformed according to the input modifying a deformation parameter, deformed basis vectors may be obtained at every point of the sweep path. In at least some embodiments, a rotation-minimizing frame technique may be used to obtain the deformed basis vectors. However, other techniques may be used. Using the sweep path segment and the basis vectors at either endpoint of the segment, the position of each input 3-D model point may be expressed. Given the transformation applied to the sweep path and the basis vectors at the sweep path points, the transformed position of each input 3-D model point may be computed. This provides a relatively fast, simple, and robust method for applying the deformation of a sweep path to the input 3-D model.

As indicated by the arrow returning to element 304, the user may iteratively independently manipulate one or more of the deformation parameters for one or more of the sweep paths. These manipulations may be performed in any order. Thus, elements 304 and 306 may be iteratively performed to apply deformations according to one or more of the deformation parameters for one or more of the sweep paths.

At 306, in at least some embodiments, the order of transformation for the sweep paths may be fixed. For example, in some embodiments, the X sweep path transformation is applied first, followed by the Y sweep path transformation, and finally the Z sweep path transformation is performed. However, note that this order is arbitrary, and other orders for transforming the sweep paths may be used in some embodiments. An advantage of this deformation technique is that the transformation applied to one sweep path (e.g., the X sweep path) is carried over when deforming the next sweep path (e.g., the Y or Z sweep path) and is still editable without undoing any of the transformations applied after it.

In embodiments where the order of transformation is fixed, and in which the user may manipulate the deformation parameters for the sweep paths in any order, processing flow may vary when deformation parameters for particular sweep paths are changed. For example, if X sweep path deformation parameter(s) are adjusted, the process goes back to the X sweep path transform, which is applied to the input 3-D model, followed by the Y sweep path setup and transform, followed by the Z sweep path setup and transform. However, if Y sweep path deformation parameter(s) are adjusted, the process may go back to the output of the X sweep path transform, apply the Y sweep path setup and transform, followed by the Z sweep path setup and transform.

As indicated at 308, once the user is done manipulating the deformation parameters and thus done deforming the input 3-D model, a deformed 3-D model may be output. In at least some embodiments, the output 3-D model may be in the same representation or format as the input 3-D model, but with the coordinates of the 3-D points of the model changed according to the applied deformation(s).

Example Implementations of a Sweep-Based Freeform Deformation Method

Some embodiments may include a means for performing sweep-based freeform deformation of 3-D models. For example, a sweep-based freeform deformation module may receive input specifying a 3-D model to be deformed, initialize sweep paths, basis vectors, and 3-D points for the input 3-D model, receive interactive input indicating modifications to one or more deformation parameters for one or more sweep paths, deform the 3-D model according to the modifications to the deformation parameter(s) for the sweep path(s), and display the deformed 3-D model. The sweep-based freeform deformation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying a 3-D model to be deformed, initializing sweep paths, basis vectors, and 3-D points for the input 3-D model, receiving interactive input indicating modifications to one or more deformation parameters for one or more sweep paths, deforming the 3-D model according to the modifications to the deformation parameter(s) for the sweep path(s), and displaying the deformed 3-D model, as described herein. Other embodiments of the sweep-based freeform deformation module may be at least partially implemented by hardware circuitry and/or firmware stored, for example, in a non-volatile memory.

Figure 7:
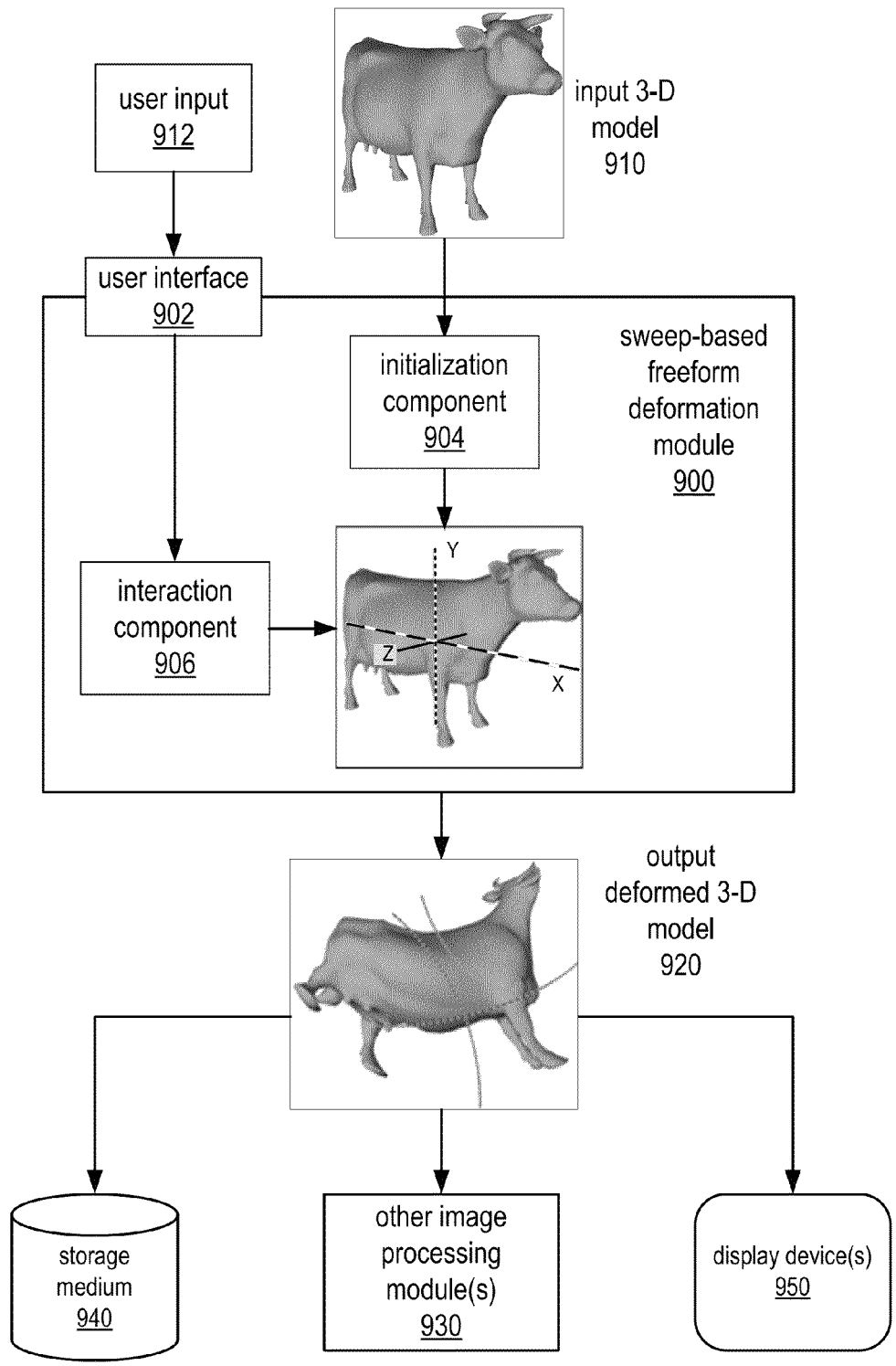
FIG. 7 illustrates an example sweep-based freeform deformation module that may implement embodiments of a sweep-based freeform deformation method for 3-D models.
Figure 8:
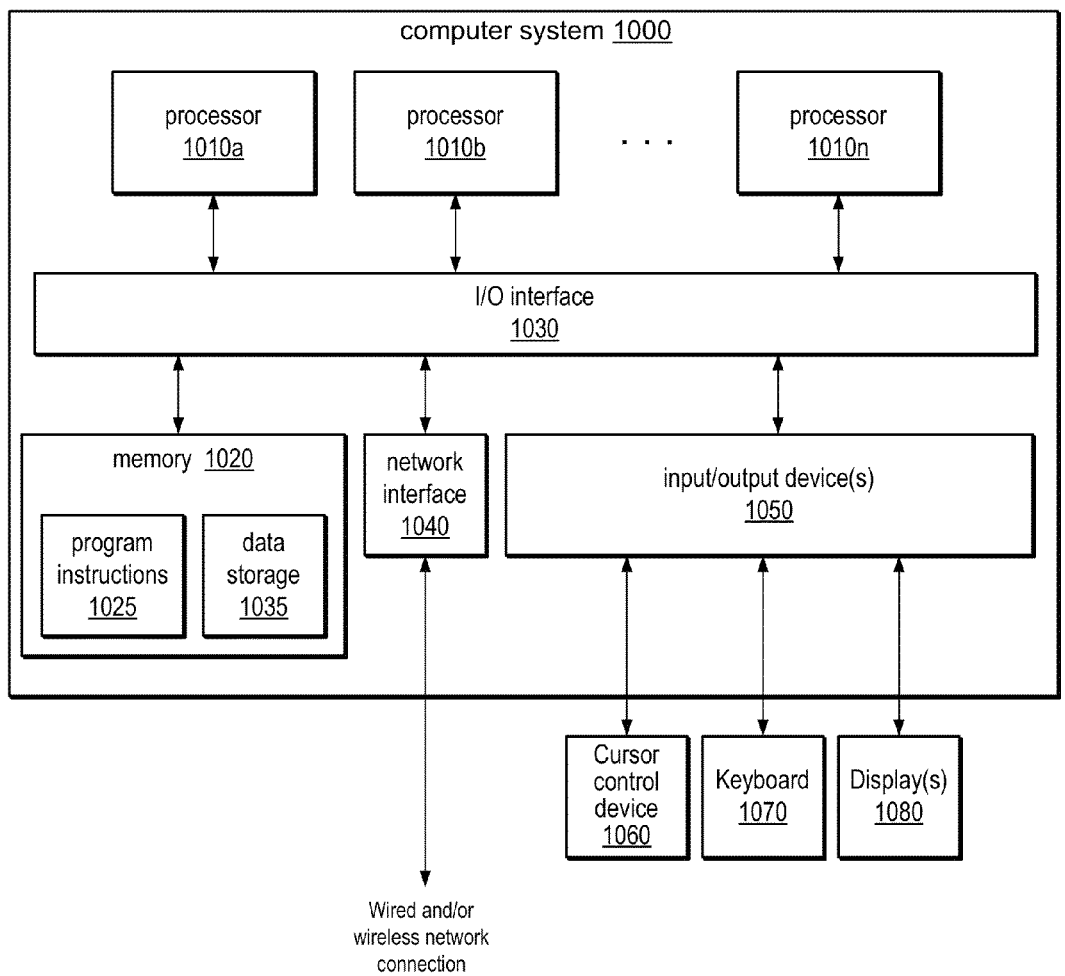
FIG. 8 shows an example system on which embodiments of the sweep-based freeform deformation method may be implemented.

FIG. 7 illustrates an example sweep-based freeform deformation module that may implement embodiments of a sweep-based freeform deformation method for 3-D models as described herein, for example as shown in FIG. 6. FIG. 8 illustrates an example computer system on which embodiments of module 900 may be implemented. Module 900 receives as input a 3-D model 910 to be deformed. For examples of an initial 3-D model, see FIGS. 1, 4A, and 5A. The 3-D model may be input in any of a variety of representations. The module 900 may include an initialization component 904 that may initialize the sweep paths, basis vectors, and 3-D point coordinates for the input 3-D model 910 as previously described. In at least some embodiments, three sweep paths, one each along the X, Y and Z directions, are fitted to the bounding box of the input 3-D model 910. For further discussion of initialization, see the section titled Initialization phase.

After initialization, an interaction component 906 of module 900 may receive user input 912 via a user interface 902 modifying at least one of a set of deformation parameters for at least one sweep path. In at least some embodiments, five deformation parameters (first bend angle, second bend angle, twist angle, scale factor, and length) may be provided for each sweep path. In at least some embodiments, the user may also specify a value for a weight function corresponding to the deformation parameter, as previously described. FIGS. 5A through 5C illustrate an example user interface via which a user may independently manipulate the five deformation parameters for each of three sweep paths that may be used in some embodiments.

Interaction component 906 of module 900 may deform the 3-D model according to the deformation parameter(s) for the sweep path(s) modified by the user input. By manipulating deformation parameters for the sweep paths, the user may deform the respective sweep paths into curved polylines, or may apply further deformation to previously deformed sweep paths. After a sweep path is deformed according to the input modifying a deformation parameter, deformed basis vectors may be obtained at every point of the sweep path. Using the sweep path segment and the basis vectors at either endpoint of the segment, the position of each input 3-D model point may be expressed. Given the transformation applied to the sweep path and the basis vectors at the sweep path points, the transformed position of each input 3-D model point may be computed. This provides a relatively fast, simple, and robust method for applying the deformation of a sweep path to the input 3-D model. For further discussion, see the section titled Interaction phase.

In at least some embodiments, the user input 912 may be provided to iteratively independently manipulate one or more of the deformation parameters for one or more of the sweep paths, and these manipulations may be performed by the user via user interface 902 in any order. In at least some embodiments, the order of transformation for the sweep paths as applied by interaction component 906 may be fixed. For example, in some embodiments, the X sweep path transformation is applied first, followed by the Y sweep path transformation, and finally the Z sweep path transformation is performed. In embodiments where the order of transformation is fixed, and in which the user may manipulate the deformation parameters for the sweep paths in any order, processing flow may vary when deformation parameters for particular sweep paths are changed. For further discussion, see FIG. 3 and the section titled Deformation along multiple sweep paths.

Module 900 may generate as output a deformed 3-D model 920. For examples of a deformed 3-D model, see FIGS. 4B through 4D. The output 3-D model 920 may, for example, be stored to a storage medium 940, such as system memory, a disk drive, DVD, CD, etc, and/or displayed to a display device 950. The user may, if desired, activate other image processing modules 930 to perform other image processing tasks on the 3-D model 920.

In at least some embodiments, sweep-based freeform deformation module 900 may provide a user interface 902 via which a user may interact with the module 900, for example to modify at least one of a set of deformation parameters for each of one or more sweep paths as described herein. An example user interface that may be used in some embodiments is shown in FIGS. 5A through 5C. The deformation parameters used in at least some embodiments may include an angle of bend in a first orthogonal direction, also referred to as a first bend angle; an angle of bend in a second orthogonal direction, also referred to as a second bend angle; an angle of twist, also referred to as a twist angle; a scale factor that controls scale along the sweep path; and a length of the sweep path. In some embodiments, the user may also control a weight function for changing one or more of the deformation parameters non-uniformly along one or more of the sweep paths. In some embodiments, the user may also control at least the initial origin point of each of the sweep paths.

Example System

Embodiments of the sweep-based freeform deformation method for 3-D models as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments a an sweep-based freeform deformation method for 3-D models are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 14, memory 1020 may include program instructions 1025, configured to implement embodiments of a sweep-based freeform deformation method for 3-D models as described herein, and data storage 1035, comprising various data accessible by program instructions 1025. In one embodiment, program instructions 1025 may include software elements of embodiments of a sweep-based freeform deformation method for 3-D models as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a sweep-based freeform deformation method for 3-D models as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
  receiving an input of a three-dimensional (3-D) model configured for freeform deformation;
  initializing, by a computer, two or more sweep paths for the 3-D model, each of the two or more sweep paths having an associated two or more deformation parameters for applying deformations to the respective sweep path, at least one of the deformation parameters comprising a scale factor parameter that controls scale along the respective sweep path, said initializing at least two of the sweep paths comprising independently fitting all of the 3-D model to each of the at least two sweep paths;

initializing, by the computer, one or more sweep path points along each of the two or more sweep paths, and two basis vectors fitted to each of the one or more sweep path points which are mutually orthogonal to the respective sweep path;

computing, by the computer, 3-D coordinates for one or more 3-D model points of the 3-D model with respect to the sweep path for each of the two or more sweep paths; and iteratively performing, by the computer:
  obtaining input modifying a value of one of the deformation parameters for one of the two or more sweep paths;
  obtaining, for each sweep path, deformed basis vectors for each sweep path point along the respective sweep path; and
  deforming the 3-D model according to the modified value of the deformation parameter for the sweep path.

2. The method as recited in claim 1, wherein said deforming the 3-D model according to the modified value of the deformation parameter for the sweep path comprises:
  applying a transform to the sweep path according to the values of the two or more deformation parameters for the sweep path to generate a deformed sweep path; and
  deforming the 3-D model according to the deformed sweep path.

3. The method as recited in claim 2, wherein said deforming the 3-D model according to the deformed sweep path comprises:
  deforming a 3-D space according to the deformed sweep path; and
  applying the deformation of the 3-D space to the 3-D model to deform the 3-D model.

4. The method as recited in claim 1, wherein said initializing the two or more sweep paths for the 3-D model further comprises initializing three sweep paths according to a bounding box of the 3-D model, wherein one sweep path is initialized along each of the X, Y, and Z axes of the bounding box.

5. The method as recited in claim 1, wherein the two or more deformation parameters associated with each sweep path include a first bend angle parameter that controls an angle of bend in a first orthogonal direction, a second bend angle that controls an angle of bend in a second orthogonal direction, a twist parameter that controls an angle of twist around the sweep path, and a length parameter that controls a length of the sweep path.

6. The method as recited in claim 1, further comprising obtaining another input specifying a weight value for the modified value of the deformation parameter prior to said deforming the 3-D model according to the modified value of the deformation parameter for the sweep path, wherein the weight value is applied by a weight function to change the modified value of the deformation parameter at the one or more sweep path points along the sweep path during said deforming the 3-D model.

7. The method as recited in claim 1, further comprising obtaining another input changing an origin of the sweep path prior to said deforming the 3-D model according to the modified value of the deformation parameter for the sweep path.

8. The method as recited in claim 1, wherein said deforming the 3-D model according to the modified value of the deformation parameter for the sweep path comprises deforming the 3-D model according to the two or more sweep paths.

9. The method as recited in claim 8, wherein said deforming the 3-D model according to the two or more sweep paths comprises, for each of the two or more sweep paths:
  deforming the sweep path according to the values of the two or more deformation parameters for the sweep path; and
  deforming the 3-D model according to the deformed sweep path.

10. The method as recited in claim 8, wherein, in said deforming the 3-D model according to the two or more sweep paths, the 3-D model is deformed according to each of the two or more sweep paths in a specified order.

11. A system, comprising:
  at least one processor; and
  a memory comprising program instructions that are executable by the at least one processor to:
    receive an input of a three-dimensional (3-D) model configured for freeform deformation;
    initialize two or more sweep paths for the 3-D model, each of the two or more sweep paths having an associated two or more deformation parameters for applying deformations to the respective sweep path, at least one of the deformation parameters comprising a scale factor parameter that controls scale along the respective sweep path, the initialization including an initial position for the sweep paths that are configurable to any orientation relative to the 3-D model;
    initialize one or more sweep path points along each of the two or more sweep paths and two basis vectors fitted to each of the one or more sweep path points which are mutually orthogonal to the respective sweep path;
    compute 3-D coordinates for one or more 3-D model points of the 3-D model with respect to the sweep path for each of the two or more sweep paths; and
    iteratively perform:
      obtain input modifying a value of one of the deformation parameters for one of the two or more sweep paths;
      obtain, for each sweep path, deformed basis vectors for each sweep path point along the respective sweep path; and
      deform the 3-D model according to the modified value of the deformation parameter for the sweep path.

12. The system as recited in claim 11, wherein, to deform the 3-D model according to the modified value of the deformation parameter for the sweep path, the program instructions are executable by the at least one processor to:
  apply a transform to the sweep path according to the values of the two or more deformation parameters for the sweep path to generate a deformed sweep path; and
  deform the 3-D model according to the deformed sweep path.

13. The system as recited in claim 11, wherein the two or more deformation parameters associated with each sweep path include a first bend angle parameter that controls an angle of bend in a first orthogonal direction, a second bend angle that controls an angle of bend in a second orthogonal direction, a twist parameter that controls an angle of twist around the sweep path, and a length parameter that controls a length of the sweep path.

14. The system as recited in claim 11, wherein, to deform the 3-D model according to the modified value of the deformation parameter for the sweep path, the program instructions are executable by the at least one processor to deform the 3-D model according to the two or more sweep paths.

15. The system as recited in claim 14, wherein, to deform the 3-D model according to the two or more sweep paths, the program instructions are executable by the at least one processor to, for each of the two or more sweep paths:
  deform the sweep path according to the values of the two or more deformation parameters for the sweep path; and
  deform the 3-D model according to the deformed sweep path.

16. A computer-readable storage memory comprising stored program instructions that are executable and, responsive to execution of the program instructions, a computer performs operations comprising:
  receiving an input of a three-dimensional (3-D) model configured for freeform deformation;
  initializing two or more sweep paths for the 3-D model, each of the two or more sweep paths having an associated two or more deformation parameters for applying deformations to the respective sweep path, at least one of the deformation parameters comprising a scale factor parameter that controls scale along the respective sweep path, the two or more sweep paths not being related by a hierarchical structure;
  initializing one or more sweep path points along each of the two or more sweep paths and two basis vectors fitted to each of the one or more sweep path points which are mutually orthogonal to the respective sweep path;
  computing 3-D coordinates for one or more 3-D model points of the 3-D model with respect to the sweep path for each of the two or more sweep paths; and
  iteratively performing, by the computer:
    obtaining input modifying a value of one of the deformation parameters for one of the two or more sweep paths;
    obtaining, for each sweep path, deformed basis vectors for each sweep path point along the respective sweep path; and
    deforming the 3-D model according to the modified value of the deformation parameter for the sweep path.

17. The computer-readable storage memory as recited in claim 16, wherein, in said deforming the 3-D model according to the modified value of the deformation parameter for the sweep path, the program instructions are computer-executable to implement:
  applying a transform to the sweep path according to the values of the two or more deformation parameters for the sweep path to generate a deformed sweep path;
  deforming a 3-D space according to the deformed sweep path; and
  applying the deformation of the 3-D space to the 3-D model to deform the 3-D model.

18. The computer-readable storage memory as recited in claim 16, wherein, in said initializing the two or more sweep paths for the 3-D model, the program instructions are computer-executable to implement initializing three sweep paths according to a bounding box of the 3-D model, wherein one sweep path is initialized along each of the X, Y, and Z axes of the bounding box.

19. The computer-readable storage memory as recited in claim 16, wherein the two or more deformation parameters associated with each sweep path include a first bend angle parameter that controls an angle of bend in a first orthogonal direction, a second bend angle that controls an angle of bend in a second orthogonal direction, a twist parameter that controls an angle of twist around the sweep path, and a length parameter that controls a length of the sweep path.

20. The computer-readable storage memory as recited in claim 16, wherein, in said deforming the 3-D model according to the modified value of the deformation parameter for the sweep path, the program instructions are computer-executable to implement deforming the 3-D model according to the two or more sweep paths in a specified order.

* * * * *